350-333 SR

E197A XR 3,647,958

United States Patent [19]

Sobel

[11] 3,647,958

[45] Mar. 7, 1972

[54] FLAT-PANEL IMAGE DISPLAY WITH PLURAL DISPLAY DEVICES AT EACH IMAGE POINT

[72] Inventor: Alan Sobel, Evanston, Ill.

[73] Assignee: Zenith Radio Corporation, Chicago, Ill.

[22] Filed: Aug. 31, 1970

[21] Appl. No.: 68,086

[52] U.S. Cl.....................178/7.3 D, 315/169 TV, 340/166 EL

[51] Int. Cl.....................H04n 5/70

[58] Field of Search....................178/7.3, 7.3 D, 5.4 EL, 6; 340/166, 166 EL; 315/169, 169 TV

[56] References Cited

UNITED STATES PATENTS

| | | | |
|---|---|---|---|
| 2,015,885 | 10/1935 | Dallenbach | 178/7.3 D |
| 3,021,387 | 2/1962 | Rajchman | 178/7.3 D |
| 3,141,107 | 7/1964 | Wasserman | 315/169 TV |

*Primary Examiner*—Richard Murray
*Attorney*—John J. Pederson

[57] ABSTRACT

An image-display panel is formed to present picture elements distributed over the panel in a matrix of rows and columns. At the position of each picture element is a light-display device capable of displaying light in an amount proportional to its level of energization. Associated with each device are a plurality of energizing systems each of which is responsive to a different input signal amplitude. Each system energizes its associated light-display device at a particular level. By varying the input signal amplitude, different numbers of the energizing systems are activated and the level of energization of the light-display device, and hence its output, is varied. The light-display devices are either light producers such as electroluminescent cells or light modulators such as liquid crystals.

Enabling signals are selectively addressed to different rows of the energizing systems in response to row-selection signals. At the time that one row is selected, each column of the energizing system is selectively addressed with an individual input signal pulse that is proportional in amplitude to the picture information level of that element of the picture which is to appear at the intersection of the selected row and column. The addressing of any one of the rows simultaneously with a column effects selection of the picture element at the intersection of that row and column, and the amplitude of the voltage above a basic selection level determines the level of energization of the corresponding light-display element.

11 Claims, 3 Drawing Figures

Patented March 7, 1972 3,647,958

Inventor
Alan Sobel

By [signature]
Attorney

FLAT-PANEL IMAGE DISPLAY WITH PLURAL DISPLAY DEVICES AT EACH IMAGE POINT

The present invention pertains to image-display panels. More particularly, it relates to image-display panels that are of such reduced thickness that they may, for example, be hung on a wall.

For decades, workers in the art have been seeking a flat image display apparatus. One approach has been that of using modified electron trajectories in a cathode-ray tube so that the evacuated envelope may have substantially reduced depth. Other approaches have sought to make use of solid-state light generation or light control. Thus, solid-state diodes, electroluminescent cells, liquid crystals and mechanical shutters have been distributed over display matrices and selectively activated individually in order to create the display of an image. Some of these prior devices have found a significant degree of success, particularly for the display of simple stationary images. However, they often leave much to be desired in complexity of associated peripheral addressing systems or inability adequately to reproduce an image with a sufficient range of gray scale or contrast.

It is, accordingly, a general object of the present invention to provide an image-display panel which overcomes the aforenoted limitations.

Another object of the present invention is to provide a new and improved image-display panel arrangement that is applicable for use with any of a variety of different light generators or light modulators.

A still further object of the present invention is to provide a new and improved image-display device that permits the attainment of increased production yield and exhibits increased operating life while yet affording reasonably satisfactory performance.

The present invention is incorporated in a panel for displaying an image formed of picture elements distributed over the panel in a matrix of rows and columns. A plurality of light-display devices are individually disposed at respective different positions of the picture elements, with each such device displaying light in an amount proportional to its level of energization. Located at and associated with each of the light-display devices are a group of energizing systems. The systems within each group are individually responsive to respective different input signal amplitudes for energizing the device associated with that group at respective different levels of energization.

The panel is associated with means that supply a video signal composed of amplitude-varying picture information together with row and column selection signals. In response to the column-selection signals, different columns of the groups of energizing systems are selectively addressed with individual control signals. In response to the row-selection signals, enabling signals are selectively addressed to different rows of the groups of energizing systems. The addressing of any one of the rows conjointly with the addressing of a vertical column effects selection of the light-display device at the intersection of that row and that column. The video signal also is addressed to the rows or the columns, or to the rows and the columns, for effecting energization of the selected display device at a level corresponding to the picture information.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

Figure 1:
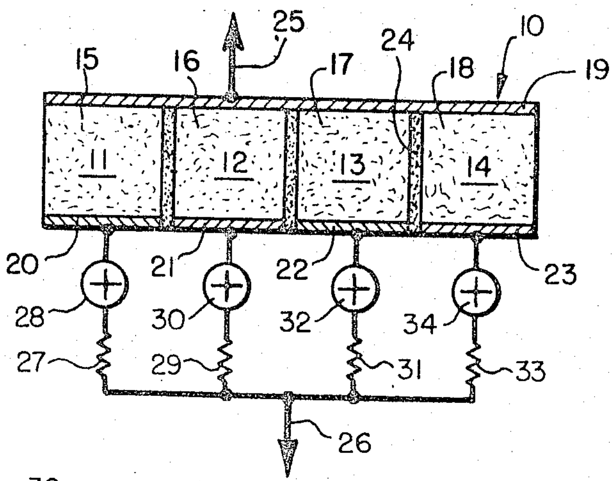
FIG. 1 is a cross-sectional view of a display device together with a schematic representation of associated energizing systems.

In FIG. 1, a light-display device 10 includes a plurality of four light-display elements 11, 12, 13 and 14. In this instance, each of elements 11–14 is an electroluminescent cell. Accordingly, device 10 includes respective segments 15, 16, 17 and 18 of electroluminescent material. A transparent electrode 19 is affixed in common to one surface of each of segments 15–18, while the opposing surfaces of those elements are individually coated with respective and electrically separate electrodes 20, 21, 22 and 23. Segments 15–18 and electrodes 20–23 are respectively separated by insulating strips 24.

As is well known, electroluminescent cells generate light when subjected to an electric field that exceeds a predetermined threshold level. Usually, the field is developed by the application of an alternating potential, although sometimes a unidirectional potential or a combination of alternating and unidirectional potentials is employed. Display elements other than electroluminescent cells may be utilized in the embodiments herein disclosed. For example, alternative light generators include injection-luminescent diodes and gas discharge cells. For light modulation instead of generation, suitable alternative elements include orientable suspended particles, liquid crystals, and electromechanical shutters. In any case, the particular kind of light-control element employed herein is one which responds to energization from an external source to display light.

Energizing current for all of elements 11–14 is supplied by way of connecting leads 25 and 26, electrode 19 being connected directly to lead 25. Lead 26 is coupled to electrode 20 of light-display element 11 by way of the series combination of an isolating resistor 27 and a conduction switch 28, the latter constituting the primary element of an energizing path for element 11. Similarly, the energizing paths for each of elements 12, 13 and 14 respectively include a resistor 29 in series with a switch 30, a resistor 31 in series with a switch 32 and a resistor 33 in series with a switch 34. It will be observed that the energizing paths are connected in parallel between leads 25 and 26.

Each of switches 28, 30, 32 and 34 exhibits a different firing voltage. That is, each one is rendered conductive, so as to energize its associated light-display element, at a level of applied potential which is different from that of any of the other three switches. Assuming, for example, that the switches become conductive at respective different levels of 200, 205, 210, and 215 volts, a signal impressed upon leads 25 and 26 of less than 200 volts will leave all of display device 10 in a dark condition. However, upon the application of a signal potential that just exceeds 200 volts, one of light-display elements 11–14 will be energized. If, instead, the applied signal exceeds 215 volts, all four of the switches will be rendered conductive, and, correspondingly, all four of elements 11–14 will be energized to produce light. Similarly, two of the light-display elements will be energized for a potential between 205 and 210 volts and three of the elements will be energized when the potential is between 210 volts and 215 volts. At the same time, of course, the total light output or brightness of display device 10 will vary directly in correspondence with the number of switches that are rendered conductive. Thus, display device 10 at the outset is capable of producing light at four different output levels depending upon the selected level of the energizing potential. Moreover, since each of electroluminescent cells 11–14 is in itself also voltage dependent, the first one excited produces still more light as the applied voltage is increased to activate the second one, and so forth. This cumulative effect increases the contrast ratio to an amount even greater than the number of cells per display device.

Switches 28, 30, 32 and 34 need not be of any particular kind, so long as, individually or in combination with their associated light-display elements, they collectively exhibit a plurality of respectively different threshold levels. In principle, the switches in themselves may exhibit like thresholds but combine with the characteristics of either the isolating resistors or the light-display elements so that, when operated in the combination, energization of the individual different light-display elements occurs only at the respective different threshold levels. Moreover, the switching functions may be incorporated into the light-display elements themselves. For example, gas cells of differing thicknesses exhibit differing firing voltages. Thus, the display device may be constructed of four contiguous gas cells each of a different thickness. In any case, the switches complete a group of parallel energizing systems respectively responsive to different input signal amplitudes for energizing display device 10 at respective different levels of energization.

As illustrated, however, each of the switches is physically distinct from its associated light-display element. Ovonic switches, constructed of amorphous semiconductor material, are appropriate. Such switches are described in an article by George Sideris entitled "Transistors Face an Invisible Foe," which appeared in ELECTRONICS, pages 191–195, Sept. 19, 1966, and in an article entitled "Amorphous-Semiconductor Switching" by H. K. Henisch which appeared at pages 30–41 of SCIENTIFIC AMERICAN for September 1969. Each Ovonic switch may simply be a small layer or dot of a glasslike material deposited upon an electrode. Differences in material constituents or in thickness permit the Ovonic switches to exhibit different threshold levels. The threshold voltage apparently is a function of the energy band-gap structure of the material.

Whatever the form of switch selected for use in the energizing systems of display device 10, it is preferable that the switches, either alone or in combination with the parameters of the associated elements, exhibit bistability in the sense that, once fired, each switch continues to pass current, from a source of AC or DC sustaining voltage to its light-display element, as long as a certain minimum potential is maintained. Both Ovonic threshold switches and gas cells exhibit this characteristic. Accordingly, a sustaining potential may exist continuously across leads 25 and 26; its value may be only slightly below the minimum threshold level of any of the associated switches. The desired number of switches are then actuated simply by superimposing a control pulse upon the sustaining potential so as to raise the total potential value above the desired threshold level. Ovonic memory switches similarly may be employed; these require the affirmative application of an appropriate turnoff pulse.

Resistors 27, 29, 31 and 33 serve to isolate each energizing path from all of the others as well as to limit the current through the switches and light-display elements. In this way, the conductivity of any one switch does not serve to short, or partially short, the other switches. In principle, the isolating function may exist either in the switch itself or in the associated light-display element. Isolation alternatively may be obtained by the use of either a capacitor or an inductor, although the latter is semmingly impractical in a minute-display-element combination. The threshold levels may also be altered by variation of the impedances presented by resistors 27, 29, 31 and 33. Similarly, the impedances of these isolating elements also may be varied so as to achieve a weighting of, or a nonlinear relationship between, the intensity of light developed and the number of switches fired. In this manner, contrast rendition is improved by effecting a larger range of contrast even though the number of distinguishable levels is not increased.

Figure 2:
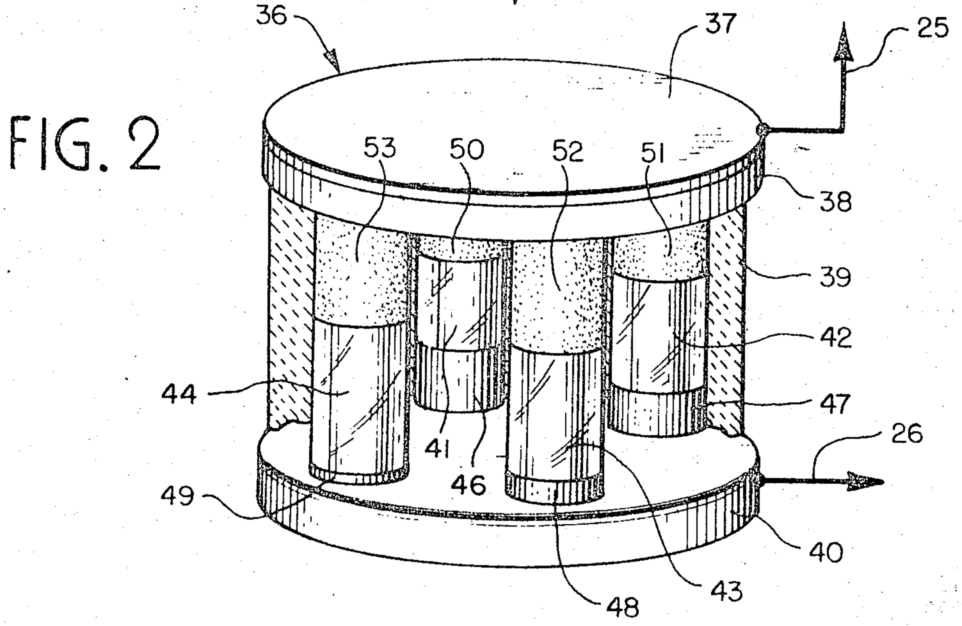
FIG. 2 is a perspective view, partially broken away, of a light-display device and associated energizing systems.

FIG. 2 illustrates on a practical form of construction in which a display device 36 of generally cylindrical configuration is composed of a transparent electrode 37 connected to lead 25 and covering one surface of an electroluminescent layer 38. The latter, in turn, is adjacent to a filler 39 of insulating material across the opposite surface of which is another electrode 40 to which lead 26 is connected. Respectively deposited within four holes formed in filler 39 are four Ovonic switches 41, 42, 43, and 44 spaced from and electrically connected to electrode 40 by corresponding counterelectrodes 46, 47, 48 and 49. Disposed adjacent to the opposite ends of the switches and electrically connecting them to electroluminescent layer 38 are a respective set of resistive conductors 50, 51, 52, and 53 which may be composed of cermet materials, graphite in an insulating binder, or the like. As in FIG. 1, the purposes of the resistive elements are to isolate the different energizing paths, so that the conductivity of any one switch will not short the other switches, and to limit the current through the switches and display elements.

As particularly illustrated in FIG. 2, the variation in switching threshold levels is obtained by variations in the thickness of the Ovonic switches. Being of the least thickness, switch 41 has the lowest threshold level. In correspondence with the different switch thicknesses, counterelectrodes 46–49 also have different thicknesses so that electrode 40 may be disposed parallel to layer 38 and electrode 37.

The operation of display device 36 is the same as that of display device 10 except that, in the FIG. 2 embodiment, electroluminescent layer 38 is composed of a single, continuous disc of electroluminescent material. Thus, layer 38 considered as a whole is actuated at different light-display levels by respective different ones of the associated group of energizing systems that collectively includes all of switches 41–44. In this case, light is produced only from that portion of layer 38 which is within the electric field or fields created between electrode 37 and the one or ones of the resistive conductors associated with actuated switches. Consequently, the total quantity of light produced at any instant depends upon the number of the Ovonic switches actuated at that particular time and thus upon the number of different discrete light-emitting areas then under activation. Each such area is a light-display element and is equivalent to one of the separate segments in FIG. 1. When, however, the particular form of device 36 is one in which the quantity of light output is a function of the level of current conducted through the active element, the entire light-emission surface of the element may be producing light although the quantity of that light is a function of the number of switches actuated at any particular time. An injection-luminescent diode is a light producer of this latter character.

Figure 3:
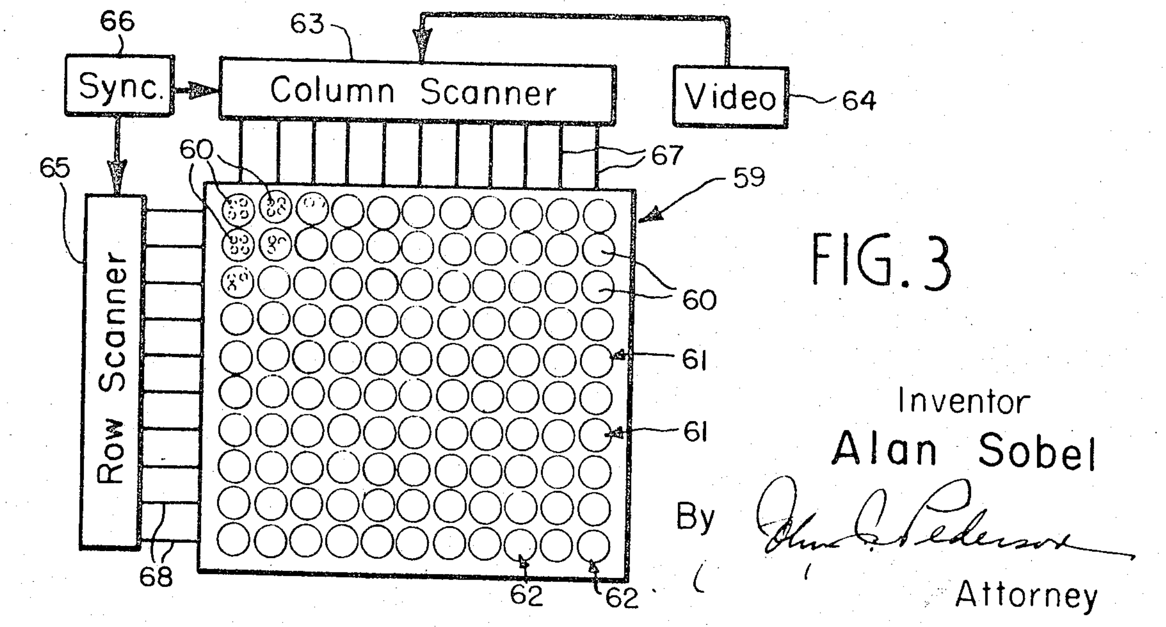
FIG. 3 is a diagram of an image-display panel incorporating devices and systems as shown in FIG. 2 together with an addressing system for the panel.

FIG. 3 depicts an image-display panel composed of a plurality of light-display devices 60 at respective different picture-element positions distributed over the panel in a matrix of rows 61 and columns 62. Each device 60 is constructed like device 36 of FIG. 2 to include an electroluminescent cell together with a plurality of switches. A column scanner 63 selectively addresses different ones of columns 62 with individual control signals. In this case, those control signals include an input signal component that is proportional in amplitude to respective different levels of picture information derived from a video-signal source 64. At the same time, a row scanner 65 addresses different ones of rows 61 with enabling signals.

Scanner 63 responds to column-selection signals from a synchronizer 66 which also supplies row-selection signals to scanner 65. The addressing of any one row 61 conjointly with the addressing of a respective column 62 effects selection of the display device 60 located at the intersection of that row and that column. The level of energization of the selected display device depends, in the illustrated version, upon the amplitude of the control signal applied to that column, and that amplitude, in turn, corresponds to the level of the picture information from video source 64. That is, the number of the associated switches that are activated at the selected display device is a direct function of the video level.

Using the exemplary threshold values given above, it will be observed that 200 volts constitutes a basic selection level. The sum of the control and enabling signals, without the addition of any video signal component, should be almost equal to that value of 200 volts. Under these assumed conditions, the video component then should have an amplitude range, as the video level varies, of a little more than 15 volts in order to afford activation of from none to all four of the switches associated with each display element. Of course, entirely different voltage combinations may be employed. Care is to be taken that the video component is insufficient by itself, in any given arrangement, to actuate a device switch associated with any light-display device not selected by the control enabling signals.

Scanners 63 and 65 may take any of a number of known forms. One conventional approach is to include in each scanner a shift register that is stepped from each one output to the next by a series of gating pulses in turn initiated by a timing clock that is synchronized with the signals from synchronizer 66. For use as a television display, scanner 65 selects rows 61 sequentially in succession from top to bottom and, while each row is selected, scanner 63 sequentially selects successive columns 62 from left to right. Upon the conclusion of one complete scan of all elements in panel 59, the synchronizing information resets the scanners so that the scanning process begins anew. Thus, the image as viewed over a period of time represents a succession of frames within each of which the video information is displayed line by line, just as in the conventional technique of image scanning upon the face of a cathode-ray tube.

In operation, a sustaining voltage is maintained throughout each frame interval between all of the leads 67 connecting scanner 63 to columns 62 and the leads 68 connecting scanner 65 to rows 61. Each of devices 60 includes switches of the nature discussed above that permit continued device energization, under the application of the sustaining voltage, once actuated by the video component of a control signal. Accordingly, each of devices 60 that has been actuated, in whole or in part, during the most recent frame interval remains in that state by virtue of the sustaining voltage continued during that same interval. Thus, each of the display devices exhibits persistence or storage, as a result of which the overall image is substantially brighter than would be the case if light were produced only at the instant of addressing each individual display device. Correspondingly, row scanner 65 serves the additional function of extinguishing all of the display devices in each row shortly before that row is addressed anew during the succeeding frame. To this end, the shift register or other row-addressing device may either break the connection to each row before that row is again selected or it may supply a pulse of such amplitude and polarity that current from the sustaining voltage source is extinguished without any nonconducting switch being caused to conduct.

In the form illustrated in FIG. 3, the video component is applied sequentially across each row. In an alternative approach, all columns in a row are addressed simultaneously. To that end, scanner 63 may include a bank of storage elements into which each line of video information is first stored. When a row then is selected, the bank is "dumped" to distribute the stored video components into all of the respective columns at the same time. A suitable addressing system with external storage is disclosed and claimed, for example, in the copending application of Richard A. Easton, Ser. No. 755,961, filed Aug. 28, 1968, and assigned to the same assignee as the present application.

Whatever the form of addressing, there also is flexibility in choosing the nature of the different addressing signals. For example, the row "enabling signal" might simply be the completion of a ground return, while the entire selection potential as well as the video component may constitute the "control signal." In general, for point-by-point addressing, there may be mixed selection and video modulation on both rows and columns, or the potentials may be separately applied as desired. For addressing an entire row simultaneously, the video modulation is fed to the columns while the selection potential preferably is divided between the rows and columns. Although it might complicate the particular arrangement of FIG. 3, it is to be further noted that the video component may be supplied to the groups of switch systems by a separate array of conductors or equivalent addressing means. In any event, the addressing may be according to a repetitive program as in television or be selective upon command. Moreover, the matrix pattern of FIG. 3 has been described in terms of its orthogonally related rows and columns in order to clarify the presentation by reference to such a well-understood form of array. However, such language is intended to embrace equivalent display patterns such as those used in plan-position indicators and similar readout apparatus. In this connection, it will be noted that the "control" and "enabling" signals as described herein together constitute a matrix position-selection signal.

An image display panel has thus been disclosed wherein a group of switches are included at each image point or picture element. Increased production yields are achieved for the reason that failure of a single switch at a picture element is not a complete failure of that picture element. Although such an individual switch failure results in a local amplitude distortion, the degree of impairment is not such as to render the panel inoperative for most purposes. The reliability of the display panel during its operating life is thereby increased for the same reason. The failure of a few switches scattered throughout the panel amounts only to a very small degree of local distortion which in many cases would not even be noticed.

The particular approach of the present invention may be viewed as that of complicating the display panel for the sake of simplifying the peripheral addressing system. However, present-day techniques of solid-state fabrication and the availability of minute threshold-selection switches permit such complication of the panel itself without much practical additional difficulty. Accordingly, the display panels of the present invention permit the attainment of an adequate range of contrast without imposing requirements of undue complexity on the addressing systems.

While particular embodiments of the present invention have been shown and described, it is apparent that changes and modifications may be made therein without departing from the invention in its broader aspects. The aim of the appended claims, therefore, is to cover all such changes and modifications as fall within the true spirit of the invention.

I claim:

1. In a panel for displaying an image formed of picture elements distributed over said panel in a matrix, the combination comprising:

a plurality of light-display devices disposed at the respective positions of said picture elements, each of said devices displaying light in an amount proportional to its level of energization;

a corresponding plurality of groups of energizing systems, each group being located at and associated with one of said devices and each system within each group being responsive to a different input signal amplitude for energizing its associated device at a correspondingly different level of energization;

means for supplying a video signal composed of amplitude-varying picture information together with position-selection signals;

means responsive to said position-selection signals for selectively addressing different groups of energizing systems;

and means responsive to said video signal for applying to each addressed group of energizing systems an input signal proportional in amplitude to the level of picture information at the corresponding picture element.

2. A panel as defined in claim 1, in which each of said light-display devices is composed of a plurality of separate light-display elements actuated at different light-control levels by the respective energizing systems in the associated group.

3. A panel as defined in claim 1, in which each of said light-display devices is a single light-producing element actuated at different light-display levels by the respective energizing systems in the associated group.

4. A panel as defined in claim 1, in which each of said groups of energizing systems includes a plurality of switches respectively responsive to different input signal amplitudes.

5. A panel as defined in claim 4, in which each of said switches is individually associated with means for isolating that switch from the effects of the other switches in its group of systems.

6. A panel as defined in claim 1, in which each of said display devices comprises a plurality of display elements and the associated group of energizing systems includes a corresponding plurality of mutually differing threshold switches spaced from one another and each coupled to a different one of said display elements.

7. A panel as defined in claim 1, in which each group of energizing systems responds only to signals exceeding a predetermined threshold and thereafter maintains its response to signals of a lesser level, and said addressing means and video-signal-responsive means apply input signals cumulatively exceeding said threshold level.

8. A panel as defined in claim 1, in which each of said light-display devices is composed of a plurality of light-display elements each of which, in turn, displays light in an amount proportional to its level of energization, in which each of said elements individually is coupled in series with a respective one of the systems in the associated group, and in which the series combinations of said elements and systems are coupled in parallel.

9. An image display panel comprising:

an array of horizontal conductors spaced vertically across said panel;

an array of vertical conductors spaced horizontally across said panel;

a plurality of light-display devices individually associated with respective crossings of said horizontal and vertical conductors and each displaying light in proportion to its level of energization;

a corresponding plurality of groups of energizing systems, each group being located at and associated with one of said devices and each group at each location being responsive to a plurality of different input signal amplitudes for energizing its associated device at correspondingly different levels of energization;

means for supplying a video signal composed of picture information together with synchronizing signals;

means responsive to said video signals for applying to said vertical conductors individual input signals, proportional in amplitude to said video signal;

and means responsive to said synchronizing signals for enabling actuation selectively of said horizontal conductors, the actuation of any one of said horizontal conductors conjointly with the application of said input signals on a vertical conductor effecting selection of the level of energization of the light-display device at the cross point between the selected horizontal and vertical conductors.

10. In a panel for displaying an image formed of picture elements distributed over said panel in a matrix of rows and columns, the combination comprising:

a plurality of light-display devices disposed at the respective positions of said picture elements and each displaying light in an amount proportional to its level of energization;

a corresponding plurality of groups of energizing systems, each group being located at and associated with one of said devices and each system within each group being responsive to a different input signal amplitude for energizing its associated device at a correspondingly different level of energization;

means for supplying a video signal composed of amplitude-varying picture information together with row and column selection signals;

means responsive to said column-selection signals for selectively addressing different columns of said groups of energizing systems with individual control signals;

means responsive to said row-selection signals for selectively addressing different rows of said groups of energizing systems with enabling signals, the addressing of any row conjointly with the addressing of a vertical column effecting selection of the light-display device at the intersection of that row and that column;

and means responsive to said video signal for applying to the energizing systems associated with the selected light-display device an input signal proportional in amplitude to the level of picture information at the corresponding picture element.

11. A panel as defined in claim 10, in which the input video signals are superimposed on said control signals.

* * * * *